Oct. 12, 1937.   D. H. MITCHELL   2,095,935
CONTROL APPARATUS
Filed Jan. 8, 1936
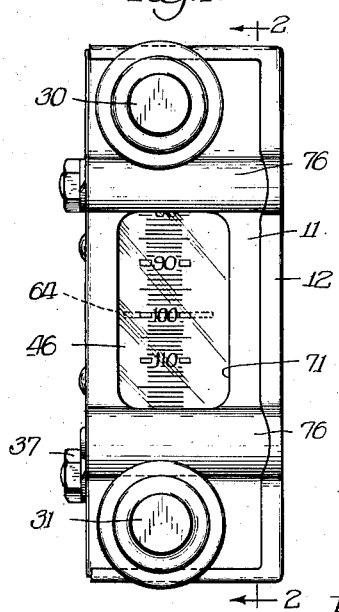
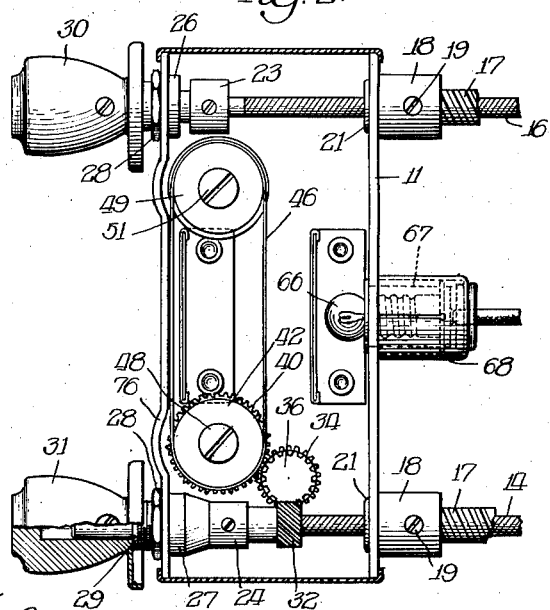
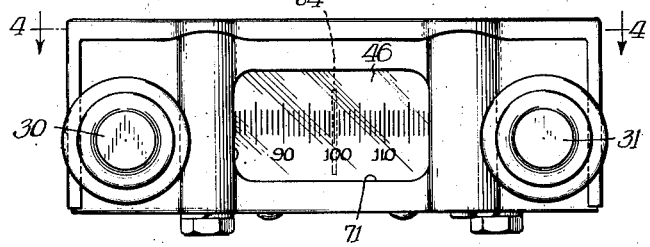
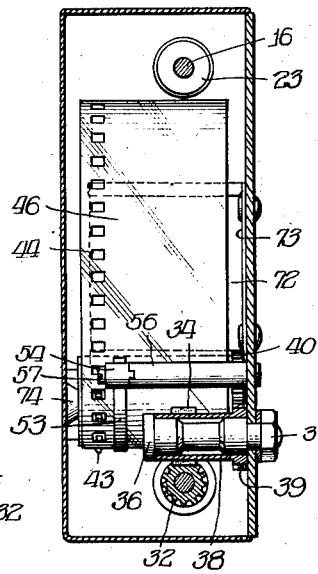
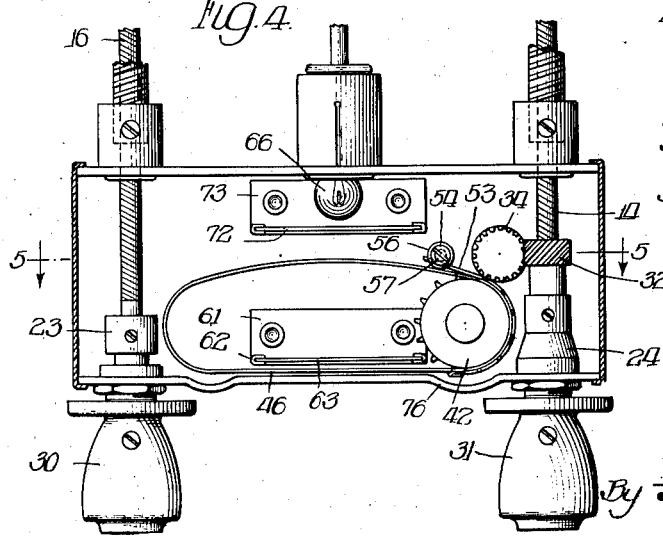
Inventor:
Donald H. Mitchell,
By Foorman L. Mueller
Atty.

Patented Oct. 12, 1937

2,095,935

UNITED STATES PATENT OFFICE 2,095,935

CONTROL APPARATUS

Donald H. Mitchell, Chicago, Ill., assignor to Galvin Manufacturing Corporation, Chicago, Ill., a corporation of Illinois Application January 8, 1936, Serial No. 58,160

9 Claims. (Cl. 116—124.1)

This invention relates to control apparatus, and more particularly to control heads including means for indicating the position or adjustment of the controlled device.

The control head of this invention is especially suitable for control of such apparatus as radio receiving sets. In the illustrated form it is designed especially for remote control of receiving sets in vehicles where the control head is located closely enough to the receiving set so that the control connection between the two may be by flexible cable.

It is common practice to mount the control heads for automotive radios on the instrument panel with most of the control head hidden on the front side of the instrument panel, but with the control handles extending through the panel, and with some indicating means in the control head visible through a suitable aperture in the instrument panel. It is of course desirable that these control heads take up as little space as possible, or particularly that they project forwardly from the panel as little as possible so as not to obstruct the wires running to other instruments on the panel and so as not to require the control cables to be bent too sharply. At the same time it is of course necessary to have an indicating means which is operable through the full range of adjustment of the controlled device, and it is desirable that this indicating means be on a large enough scale to be clearly visible from the driver's seat, so that the driver can see its adjustment at a quick glance. These two requirements are reconciled according to the present invention by providing the indicating scale on a continuous strip of flexible film which may be carried in the shape of a loop with its dimension from front to back being relatively small.

It is therefore an object of this invention to provide a control head having a compact mechanism which does not project far from the panel on which it is mounted, but which nevertheless includes an indicating means of large scale.

It is a further object of the invention to provide control apparatus in which the indicating means appears to have a linear movement rather than a circular movement. In moving scale indicators a linear movement is often preferred, largely as a matter of appearance.

A related object is to provide control apparatus having a flat indicator which may be located between two knobs or handles and yet has a linear movement of large scale.

Another object of the invention is to provide such a control head which is of a simple construction, economical to manufacture, and yet thoroughly dependable.

A still further object is the provision of a control apparatus having indicating means such as to make possible a simple and readily effected change to permit horizontal or vertical mounting of the control apparatus.

Inasmuch as the control head of the present invention is mounted in a conspicuous position on the instrument panel of an automobile, it is an object to provide not only a dependable and efficient mechanism, but also a structure of pleasing appearance.

Other objects and advantages of my invention will be apparent from the following description, taken with the drawing, in which:

Fig. 1 is an elevation looking at the face of the control head.

Fig. 2 is a sectional view taken substantially along the line 2—2 of Fig. 1.

Fig. 3 is an elevational view of a slightly modified form of the control head.

Fig. 4 is a sectional view substantially along the line 4—4 of Fig. 3.

Fig. 5 is a sectional view taken substantially along the line 5—5 of Fig. 4.

Although this invention may take numerous forms, only two have been chosen for illustration. In both of these forms the control head includes a frame which may desirably comprise a substantially channel-shaped member 11 and a suitable cover 12. At least one, and usually two, control cables are extended to the frame 11. In the illustrated forms these cables are the cable 14 for controlling the tuning means of the radio, and cable 16 for controlling the volume, and if desired, operating a switch for turning the radio on and off. Each of these cables is carried in a flexible sheath 17 which is secured to a bushing 18 by a set screw 19, the bushings 18 being secured to the frame 11 by extending through a hole therein and being upset as indicated at 21. The end of cable 16 is secured in a coupler 23 as by the suitable set screws shown, and the cable 14 is similarly secured in a coupler 24. These couplers extend through bushings 26 and 27 and are secured in handles 30 and 31. The bushings 26 and 27 extend through the frame 11 and may be secured in place by nuts 28. The coupler 24 is secured within and seated on the bushing 27 by a U-shaped washer 29 which may bear against a non-friction washer 30 if desired. This accuracy is not necessary for coupler 23, and it may be positioned by the amount the sheath 17 is shoved into or through bushing 18.

The coupler 24 has formed integrally thereon a worm gear 32 which meshes with a corresponding worm gear 34 carried on a pin 36 which may be secured to the bottom of the frame 11 as by a nut 37. The worm gear 34 may be conveniently formed integrally on a sleeve 38 which has formed integrally at its bottom a pinion 39 as shown best in Fig. 5. The pinion 39 meshes with teeth 40 which are formed on a film-carrying spool 42. At its upper end the spool 42 has film-engaging teeth 43 formed thereon which fit into the perforations 44 on a loop of flexible film 46 marked with suitable indications as shown. The film-carrying spool 42 may be mounted on a post 48 which may be secured to the bottom of the frame 12 by upsetting or by a suitable nut.

In the form of the invention shown in Figs. 1 and 2, a second film-carrying spool 49 is provided, being rotatably mounted on a post 51 secured to the bottom of the frame 11 by a nut or by upsetting. It is not necessary for this spool to have any film-engaging teeth, since the film is driven by the spool 42.

In the form of invention shown in Figs. 3, 4, and 5, the second spool 49 is dispensed with, the film being held on the spool 42 by a spring clip 53 which may be secured to a sleeve 54 mounted on a post 56 on the base of the frame 11 and secured by a screw 57. By tightening the screw 57 the sleeve 54 and spring clip 53 may be secured in a position to put the correct amount of tension against the film on the spool 42, being keyed in this position if desired. To remove the film from the spool the screw 57 may be loosened slightly, after which the clip 53 may be raised and swung away from the spool 42 and the film 46 released from the sprocket teeth on said spool. Except for using the spring clip 53 instead of a second roll, the two forms of the invention may be the same. However, additional fixed guide means may be provided for the film in the Fig. 4 form if desired.

Either form of the invention may be provided with a bracket 61 preferably riveted or spot welded to the bottom of the frame 11 and having upstanding U-shaped holders 62 into which may be inserted a translucent screen 63. On this screen may be provided in opaque characters a reference line indicated by the dotted line 64 in Figs. 1 and 3, and any other insignia that may be desired, such as the trade name of the radio receiving set.

To illuminate the plate 63 and also the film 46, so as to make the characters thereon visible as in silhouette, a lamp 66 is provided. This lamp is inserted through a bushing 67 similar to the bushings 18, and may be secured thereto by a resilient cup-shaped holder 68, or in any other suitable manner as desired. A suitable construction for the holder 68 and the assembly therewithin is illustrated in my prior application Serial No. 28,037. It is preferred that the filament of the lamp be positioned within the frame 11 so that the light will be reflected on the walls thereof to furnish an indirect lighting effect.

It will be noticed that the film 46 has a visible reach adjacent an opening 71 in the frame 11 and an invisible reach between the visible reach and the lamp. To prevent the invisible reach from throwing shadows on the visible reach, a screen 72 is placed between the lamp and the invisible reach. This screen 72 is supported in the same manner as screen 63 by a bracket 73. The screen may be entirely opaque or it may permit a small amount of light to pass therethrough. Its surface toward the lamp 66 is preferably white or metallic so as to reflect the maximum amount of light. The screen also protects the film from the heat of the lamp 66.

The posts 48 and 51 are preferably headless, so that the spools may be slipped off of said screws to apply or replace the film. The cover 12, which may be secured by a screw, not shown, will prevent their accidental displacement at other times. To aid in this, bosses 74 may be depressed from the cover as seen in Fig. 5.

The visible side of the frame 11 is preferably shaped with ribs 76 thereon adjacent the film spools to conserve space as much as possible, or, in other words, the nuts 28 may be counter-sunk with respect to the outermost face of the frame 11.

It should be understood that the control head will be mounted on an instrument panel of an automobile, adjacent a hole in said panel alined with the aperture 71. The control head may be secured by additional nuts on bosses 26 and 27. There will usually be a frame in the hole in the instrument panel, and if so it may project within the aperture 71 and press the film 46 fairly close to the screen 63 so that the characters on the screen 63 will be clearly visible through the film 46. If there is not such a frame on the instrument panel of the automobile, the screen 63 may of course be originally positioned closer to the film 46 than it is here illustrated.

From the foregoing it is seen that with either form of the invention an indicator having large scale characters with linear movement is provided. At the same time the depth of the control apparatus from front to back is quite small. Furthermore, the parts are of a simple nature and few in number.

The operation of the device is exceedingly simple. A handle 30 turns the cable 16 through the coupler 23 to turn the radio on and adjust its volume. The handle 31 turns the coupler 24 and the cable 14 to tune the radio receiving set, that is, to select a desired program being broadcast. At the same time the worm gear 32 turns the worm gear 34 and integral pinion 39 (Fig. 3), which in turn rotates the sprocket pulley 42 on which the film 46 is mounted. This moves the film 46 in a direction and amount corresponding to the movement of the tuning means of the radio set, and hence the character on the film which is opposite the reference line 64 will indicate the station or frequency for which the receiving set is tuned.

Although only the preferred embodiments of my invention have been herein illustrated and described, it is to be understood that I am not limited thereby, but limit my invention only by the scope of the appended claims.

I claim:

1. A control device including means for operating the member to be controlled, a sprocket spool and a loop of transparent flexible film extending around said spool and visibly past a reference point, said film being moved through said loop by said spool and having characters thereon for indicating the position of said member, indicator means beyond said film and visible through said film for indicating the reference point, a lamp beyond said indicator means for illuminating said screen and said film, said lamp being positioned beyond the return run of the loop and being separated therefrom by a screen having poor light-transmitting qualities, whereby shadows of characters on said return run are avoided, and a mounting housing for said lamp and film.

2. A control device including means for operating the member to be controlled, a sprocket spool and a loop of flexible film extending around said spool and visibly past a reference point, said film being moved through said loop by said spool and having characters thereon for indicating the position of said member, and a resilient and removable guard adjacent to said spool for keeping the film thereon.

3. A control device including means for operating the member to be controlled, and a housing having a front panel with a viewing opening, a driving spool, a translucent flexible film having indicating figures thereon, positioned on said spool and looped at each end to provide a double run with substantially parallel paths spaced apart and each substantially parallel to said front panel, with said driving spool moving said film and carrying the same past a reference point visible in said opening, illuminating means for said film including a lamp mounted to the rear of the double run looped film, and means cooperating with said illuminating means to cause only the indicating figures on the run of film at said opening to be visible for indication at said opening.

4. A remote control panel for an auto radio receiver, said control panel adapted for mounting on an automobile dash board, said panel including a housing having a front plate supporting a pair of spaced apart control shafts with control knobs thereon, and a viewing opening in said panel intermediate said shafts, a transparent flexible film having indicating characters thereon in said housing driven by means including one of said control shafts and looped to follow a pair of elongated paths between said control shafts, with one of the paths passing said opening, illuminating means in said housing to the rear of said film in the double path, and means acting upon said illuminating means to cause only the indicating figures on the film in the path past the opening to be visible at said opening.

5. A control device including means for operating the member to be controlled, a continuous flexible transparent film having indicating characters thereon, a viewing opening for said film, with said film moving upon movement of said operating means and looped in said device in a double run with a visible run passing said viewing opening and a return run to the rear thereof, illuminating means to the rear of said return run, and means between said illuminating means and said film for avoiding shadows from said return run that would appear on said film on said visible run.

6. In a device for mounting on the instrument panel of an automobile to control and indicate the controlled position of a radio receiver mounted on said automobile, means for controlling said radio receiver, a sprocket spool movable upon movement of said control means, and a continuous loop of flexible film extending around said spool and visibly past a reference point visible in front of said instrument panel, said film being moved through said loop by said spool and having characters thereon for indicating the controlled position of the receiver, said film loop being elongated in a direction parallel to said instrument panel and with a visible run and a return run each substantially parallel thereto and spaced apart slightly from one another, whereby the characters on said film may be of a large scale while said film takes up a relatively small amount of space in a direction perpendicular to said instrument panel, and illuminating means for said film to the rear of said return run.

7. A control device including means for operating the member to be controlled, a sprocket spool and a continuous loop of flexible film extending around said spool and visibly past a reference point in a visible run and a return run spaced apart and each substantially parallel to the other, said film being moved through said loop by said sprocket spool and having characters thereon for indicating the position of said member, and a second spool within said continuous loop and positioned to one side of said reference point to guide said film and with said sprocket spool to substantially define said visible run and said return run, and illuminating means on the side of said return run away from the visible run, but with only the indicating characters on the visible run visible for control indication at the reference point.

8. A control device for an automobile radio receiver including a substantially rectangular shaped cupped housing having parallel front and rear walls, with said front wall having a viewing opening therein, a continuous translucent film having indicating characters thereon, guide and driving means for said film to carry it in said housing in a double loop with a return and a visible run, the latter passing said viewing opening, control means rotatably supported on said housing acting on said guide and driving means for said film to move the latter over said runs, and illuminating means for said film at the rear wall of said housing.

9. A control device for an automobile radio receiver including a substantially rectangular shaped cupped housing having parallel front and rear walls with said front wall having a viewing opening therein, a continuous translucent film having indicating characters thereon, guide and driving means for said film to carry it in said housing in a double loop, with a return and a visible run, the latter passing said viewing opening, control means rotatably supported on said housing acting on said guide and driving means for said film to move the latter over said runs, illuminating means for said film at the rear wall of said housing, and means intermediate said illuminating means and said visible run of film acting to make only the indicating characters on the visible run of the film visible at said viewing opening.

DONALD H. MITCHELL.